F. Rhind,
Steam Engine.
No. 96,729.  Patented Nov. 9, 1869.
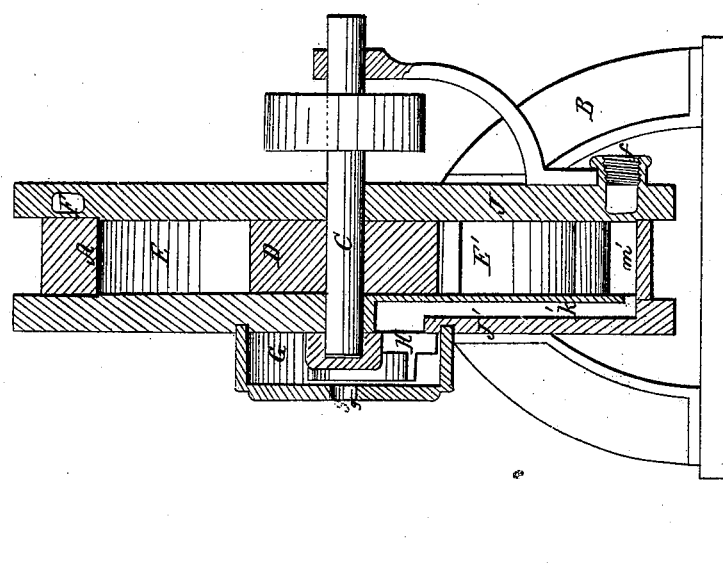
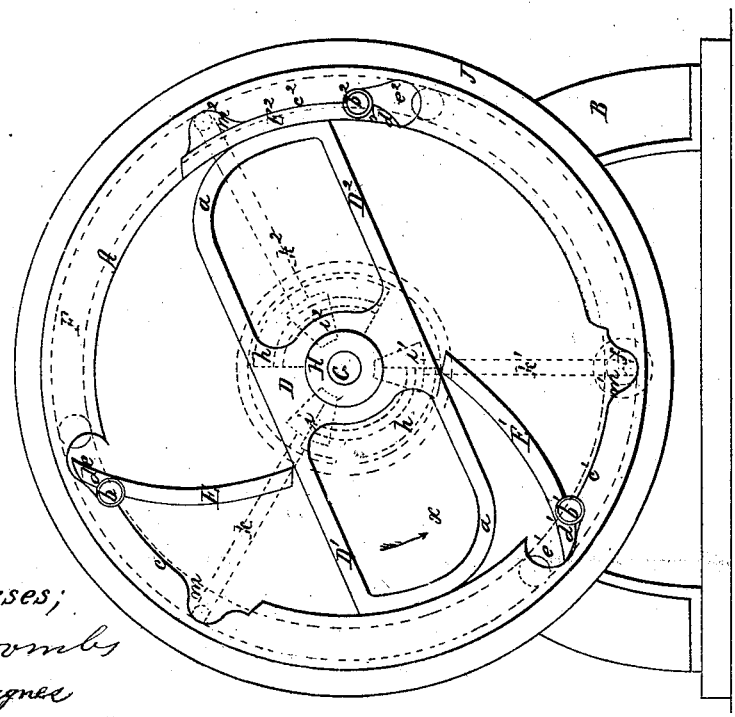
Witnesses:
J. M. Coombs
Fred Haynes
Inventor:
Frank Rhind

United States Patent Office.

FRANK RHIND, OF BROOKLYN, NEW YORK.

Letters Patent No. 96,729, dated November 9, 1869; antedated November 3, 1869.

---

IMPROVEMENT IN ROTARY STEAM-ENGINES.

---

The Schedule referred to in these Letters Patent and making part of the same.

---

*To all whom it may concern:*

Be it known that I, FRANK RHIND, of Brooklyn, in the county of Kings, and State of New York, have invented a new and useful Improvement in Rotary Engines, of which the following is a full, clear, and exact description, reference being had to the accompanying drawing, forming part of this specification, and in which—

Figure 1 represents a face or side view of a rotary engine, constructed in accordance with my improvement, with the one cylinder-cover removed, and showing, by red lines, the valve and various passages.

Figure 2 is a transverse vertical section through the centre of the engine.

Similar letters of reference indicate corresponding parts.

My improvement relates to that class of engines in which hinged abutments are used in connection with a rotating piston, working within a fixed cylinder, and in which steam is brought to bear or act upon the backs of the abutments, to keep them in contact with the piston, that is of radial character, and to allow of the piston, as it rotates, passing the abutments.

The invention, in this connection, consists of a combination of a double-leaved or armed piston, with hinged abutments arranged to establish a balance of steam-pressure on opposite sides of the main shaft, and constructed to form valves for controlling the exhaust, the same operating in concert with a rotating inlet-valve, attached to the engine-shaft.

Referring to the accompanying drawing—

A represents the engine-cylinder, and

B, the frame-work of the engine, to which said cylinder may be secured.

C is the main or engine-shaft, which is concentric with the cylinder A, and is supported in suitable bearings on opposite sides thereof.

Secured to this shaft, for rotation within the cylinder, is a piston, D, mainly of parallelogramic form, and constructed to constitute leaves or arms $D^1 D^2$ on opposite sides of said shaft, said leaves or arms having the outer portions of their faces rounded, as at $a\ a$.

This piston is restricted to travel as indicated by the arrow $x$.

E $E^1$ $E^2$ are hinged or pivoted abutments, having their fulcra, as at $b\ b^1\ b^2$, and struck of a curvature corresponding to the sweep of the cylinder A, so that when closed they fit into recesses $c\ c^1\ c^2$, and form a continuation, as it were, of the interior surface of the cylinder.

Said abutments, which are arranged at equal distances apart around and within the cylinder, also form valves, by their tail-ends $d\ d^1\ d^2$, to open and close cavities $e\ e^1\ e^2$, which communicate with a general exhaust-passage F, made in or around the one cylinder-cover J, and having its outlet, as at $f$.

Steam, to drive the engine, is admitted by an aperture or passage, $g$, to a valve-box, G, which has arranged within it a valve, H, of circular character, being made up of sector-shaped plate-like surfaces $h\ h$, and made fast to the engine-shaft, so as to rotate with it.

This valve works on or against a suitably-ground face of the one cylinder-cover J', and, as it rotates, serves to open and close or control, in regular and timely order, inlet-ports $i\ i^1\ i^2$, which communicate, by radial passages $k\ k^1\ k^2$, with cavities $m\ m^1\ m^2$ in the cylinder A, at or near the ends of the recesses $c\ c^1\ c^2$, into which the forward portions of the abutments E $E^1\ E^2$ fit.

In the operation of the engine, the action of the steam on the backs of the abutments E $E^1\ E^2$, as it is admitted by the valve H, is so regulated as that the abutments, in being forced down on the two backs $D^1\ D^2$ of the piston, partly act as levers, to impel it, but mainly serve to expose the piston-surfaces, on reverse sides or faces of the arms $D^1\ D^2$, to the steam, as, in the opening of the abutments, it is passed from the cavities $m\ m^1\ m^2$, and, by the tail-ends $d\ d^1\ d^2$, of the abutments, to open the exhaust-cavities $e\ e^1\ e^2$, in such manner as that the steam within the cylinder has a counteracting force or pressure on opposite sides of the engine-shaft.

The abutments also operating as valves to control the exhaust, and the receiving-valve being fast to the engine-shaft, so as to rotate with it, the timely admission of steam through the several inlet-ports, and passage of spent steam to the exhaust, to keep up the foregoing-specified action on the piston, are effected automatically, without the aid of special valve-gear.

Of course, such of the working parts, as necessary, may be suitably packed, and provision, in various ways, be made for obtaining a reverse driving-motion from the engine.

What is here claimed, and desired to be secured by Letters Patent, is—

The arrangement of the valve H, with reference to the inlet-passages K $K^1\ K^2$, piston D, and abutments E $E^1\ E^2$, substantially as shown and described.

FRANK RHIND.

Witnesses:
FRED. HAYNES,
J. W. COOMBS.